United States Patent
Yamashita et al.

(10) Patent No.: US 9,254,751 B2
(45) Date of Patent: Feb. 9, 2016

(54) VEHICLE CONTROL DEVICE

(75) Inventors: Takeharu Yamashita, Hiroshima (JP); Masayoshi Takahashi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 295 days.

(21) Appl. No.: 14/118,156

(22) PCT Filed: May 11, 2012

(86) PCT No.: PCT/JP2012/003092
§ 371 (c)(1),
(2), (4) Date: Nov. 15, 2013

(87) PCT Pub. No.: WO2012/157235
PCT Pub. Date: Nov. 22, 2012

(65) Prior Publication Data
US 2014/0077771 A1    Mar. 20, 2014

(30) Foreign Application Priority Data
May 17, 2011    (JP) .................................. 2011-110435

(51) Int. Cl.
*H02J 7/00*      (2006.01)
*B60L 1/00*      (2006.01)
(Continued)

(52) U.S. Cl.
CPC ... *B60L 1/00* (2013.01); *B60K 6/28* (2013.01); *H02J 7/34* (2013.01); *B60W 2540/06* (2013.01);
(Continued)

(58) Field of Classification Search
CPC ............. B60L 11/005; B60K 6/28; H02J 5/00
USPC ......... 320/109, 116, 118, 124–125, 130–131, 320/134–135, 166–167
See application file for complete search history.

(56) References Cited

U.S. PATENT DOCUMENTS

2003/0214270 A1*  11/2003  Shiue ...................... H03K 3/53
                                                             320/166
2004/0084232 A1   5/2004  Obayashi
(Continued)

FOREIGN PATENT DOCUMENTS

CN          101160688 A    4/2008
JP          2004-229447 A  8/2004
(Continued)

OTHER PUBLICATIONS

The First Office Action issued by the Chinese Patent Office on May 27, 2015, which corresponds to Chinese Patent Application No. 201280023681.2 and is related to U.S. Appl. No. 14/118,156; with English language summary.
(Continued)

*Primary Examiner* — Paul Dinh
(74) *Attorney, Agent, or Firm* — Studebaker & Brackett PC (57) ABSTRACT

[Problem] To enable effectively utilizing electrical energy of a vehicle and effectively preventing early deterioration of the second electricity storage unit. [Solution] Provided is a vehicle control device for supplying electricity to an electrical load component of a vehicle. The vehicle control device comprises: a first electricity storage unit (3) capable of holding electricity over a long period of time; a second electricity storage unit (6) capable of more rapid charge and discharge than the first electricity storage unit (3); an ignition switch detection means (24) for detecting an operational state of an ignition switch of the vehicle; a voltage detection means (10) for detecting a voltage of the second electricity storage unit (6); and a discharge means (25) for, when the ignition switch detection means (24) detects that a turn-off operation of the ignition switch is performed, and the voltage detection means (10) detects that the voltage of the second electricity storage unit (6) is equal to or greater than a preset reference value, discharging electricity stored in the second electricity storage unit (6).

7 Claims, 7 Drawing Sheets

(51) Int. Cl.
*B60K 6/28* (2007.10)
*H02J 7/34* (2006.01)

(52) U.S. Cl.
CPC ........ *B60Y 2300/92* (2013.01); *B60Y 2400/112* (2013.01); *B60Y 2400/114* (2013.01); *B60Y 2400/3086* (2013.01)

(56) References Cited

U.S. PATENT DOCUMENTS

| | | | |
|---|---|---|---|
| 2008/0211453 A1 | 9/2008 | Przywecki | |
| 2009/0015193 A1 | 1/2009 | Esaka et al. | |
| 2010/0019723 A1* | 1/2010 | Ichikawa | B60L 11/123 |
| | | | 320/109 |
| 2014/0077771 A1* | 3/2014 | Yamashita | B60K 6/28 |
| | | | 320/167 |

FOREIGN PATENT DOCUMENTS

| | | |
|---|---|---|
| JP | 2006-304393 A | 11/2006 |
| JP | 2007-161000 A | 6/2007 |
| JP | 2007-189760 A | 7/2007 |
| JP | 2009-166769 A | 7/2009 |

OTHER PUBLICATIONS

International Search Report; PCT/JP2012/003092; Aug. 14, 2012.

* cited by examiner

VEHICLE CONTROL DEVICE

TECHNICAL FIELD

The present invention relates to a vehicle control device for supplying electricity to an electrical load component of a vehicle, and more specifically to a vehicle control device comprising a first electricity storage unit capable of holding electricity over a long period of time, and a second electricity storage unit capable of more rapid charge and discharge than the first electricity storage unit.

BACKGROUND ART

Heretofore, as disclosed in the following Patent Document 1, a vehicle control device has been known which comprises: a high-voltage secondary battery including a lithium battery and for supplying electricity, primarily, to a vehicle-driving motor; a low-voltage secondary battery including a lead battery and for supplying electricity to accessory components such as a windshield wiper and an air conditioner; an electricity supply control section for activating a charge circuit connected to the high-voltage secondary battery, to charge the low-voltage secondary battery, wherein the power supply control section is operable, during an OFF state of an ignition switch circuit, to detect a remaining capacity of consumable electricity in the low-voltage secondary battery, and, when it determines that the charging is necessary, activate the charge circuit; and a safety control section operable, when it is detected that a hood (bonnet) is an open state, to prohibit the charge control, even when the electricity supply control section determines that the charging is necessary.

LIST OF PRIOR ART DOCUMENTS

Patent Documents

Patent Document 1: JP 2007-189760A

SUMMARY OF THE INVENTION

Technical Problem

The vehicle control device disclosed in the Patent Document 1 comprises a high-voltage secondary battery for driving an electric motor and a low-voltage secondary battery for supplying electricity to various accessory components, wherein the vehicle control device is configured, during an OFF state of an ignition switch circuit, to detect a remaining capacity of consumable electricity in the low-voltage secondary battery, and, when the charging is determined to be necessary, activate the charge circuit to charge the low-voltage secondary battery. This provides an advantage of being able to prevent a situation where the ignition circuit is kept in the OFF state over a long period of time, causing shortage in electricity supply capacity of the low-voltage secondary battery, or shortening of usable life the low-voltage secondary battery (consisting of a lead battery) due to a whitening phenomenon.

However, during the OFF state of the ignition circuit, when the charge of the low-voltage secondary battery is determined to be unnecessary, the high-voltage secondary battery is left in a state in which a voltage thereof is maintained at a high value, without supplying electricity from the high-voltage secondary battery to the low-voltage secondary battery, thereby causing a problem that the high-voltage secondary battery becomes more likely to undergo early deterioration. Specifically, a capacitor capable of instantaneously absorbing a large current supplied from an alternator during deceleration of a vehicle, such as an electrical double layer capacitor or a lithium-ion capacitor, is widely used as an electricity storage device for a vehicle deceleration energy regeneration system. This type of capacitor is configured to allow an upper limit value of a charge voltage thereof to be set to a value, e.g., 25V or more, which is fairly greater than that of a low-voltage secondary battery such as a lead battery, and to physically adsorb and retain electric charges, so that a high-voltage secondary battery including this type of capacitor has a property that early deterioration is more like to occur, if a situation frequently arises where, after a turn-off operation for an ignition circuit, the high-voltage secondary battery is left in a state in which a voltage of the high-voltage secondary battery is maintained at a high value.

The present invention has been made in view of the above problem, and is designed for a vehicle control device comprising a first electricity storage unit capable of holding electricity over a long period of time, and a second electricity storage unit capable of more rapid charge and discharge than the first electricity storage unit, to enable effectively utilizing electrical energy of a vehicle and effectively preventing early deterioration of the second electricity storage unit.

Solution to the Technical Problem

In order to solve the above problem, the present invention provides a vehicle control device for supplying electricity to an electrical load component of a vehicle. The vehicle control device comprises: a first electricity storage unit capable of holding electricity over a long period of time; a second electricity storage unit capable of more rapid charge and discharge than the first electricity storage unit; an ignition switch detecting device for detecting an operational state of an ignition switch of the vehicle; a voltage detecting device for detecting a voltage of the second electricity storage unit; and a discharging device for, when the ignition switch detecting device detects that a turn-off operation of the ignition switch is performed, and the voltage detecting device detects that the voltage of the second electricity storage unit is equal to or greater than a preset reference value, discharging electricity stored in the second electricity storage unit.

In the present invention having the above feature, the second electricity storage unit including a capacitor and capable of rapid charge and discharge is provided, in addition to the first electricity storage unit as a normal type including a lead battery, so that, during vehicle deceleration or downhill travel, an output current from a generator can be supplied to the second electricity storage unit to charge it, thereby effectively enhancing fuel economy of the vehicle by effectively utilizing regenerative energy during vehicle deceleration, etc. Further, when it is confirmed that the voltage of the second electricity storage unit detected by the voltage detecting device is equal to or greater than the preset reference value, at a point of time at which the turn-off operation of the ignition switch is confirmed according to an output signal from the ignition switch detecting device, the discharge control operation using the discharging device is performed, thereby providing an advantage of being able to effectively prevent early deterioration of the second electricity storage unit.

DESCRIPTION OF EMBODIMENTS

Figure 1:
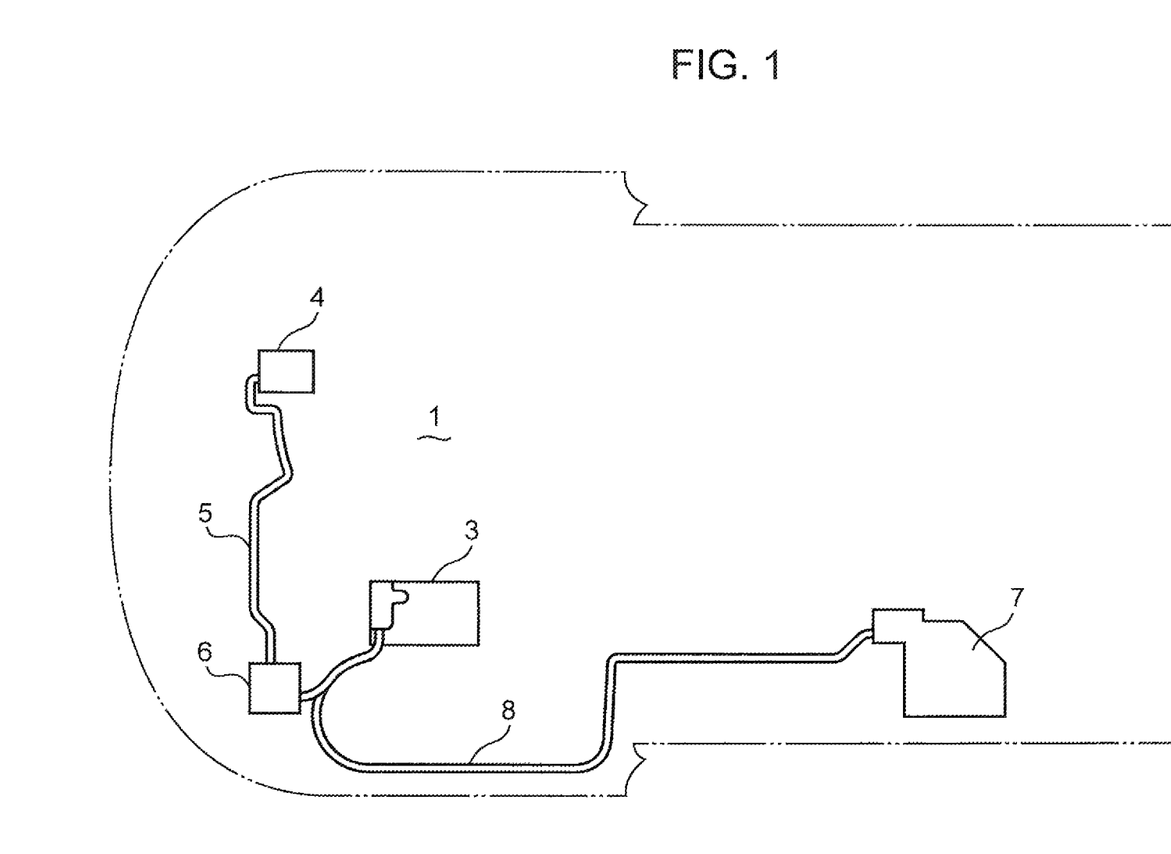
FIG. 1 is a top plan view illustrating a schematic configuration of a vehicle equipped with a control device according to the present invention.
Figure 2:
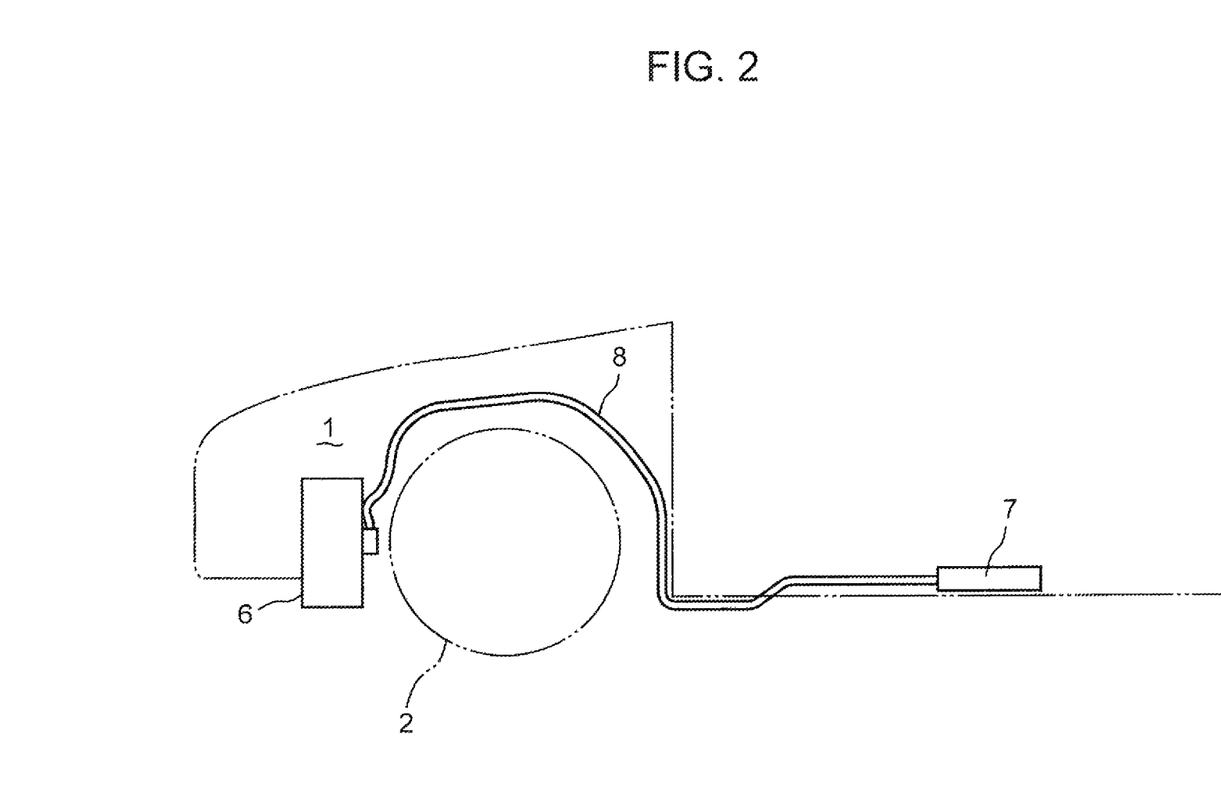
FIG. 2 is a side view illustrating a schematic configuration of the vehicle equipped with the control device according to the present invention.

FIGS. 1 and 2 illustrate a front structure of a vehicle equipped with a vehicle control device according to one embodiment of the present invention. An engine compartment 1 located at a front of the vehicle is internally provided with an engine (internal combustion engine) and a transmission whose illustration is omitted, wherein a first electricity storage unit 3 including a lead battery and capable of holding electricity over a long period of time is installed on one side (in this embodiment, left side) of an internal space of the engine compartment 1, and a generator 4 composed of an alternator and for recovering kinetic energy while converting it to electrical energy during vehicle deceleration, etc, is installed on the other side (right side) of the internal space of the engine compartment 1.

Further, a second electricity storage unit 6 connected to the generator 4 via a first harness 5 is installed on the one side of the internal space of the engine compartment 1 and frontward of a front wheel 2. The second electricity storage unit 6 comprises a capacitor constructed by series-connecting a plurality of electrical double layer capacitor cells, and has a property capable of being charged and discharged more rapidly than the first electricity storage unit 3. Thus, electricity generated by the generator 4 composed of an alternator and driven during vehicle deceleration, etc., is supplied to the second electricity storage unit 6 via the first harness 5, so that the second electricity storage unit 6 is charged to an appropriate voltage, for example, of about 14 to 25 V, depending on an output voltage of the generator 4.

In a passenger compartment located rearward of the engine compartment 1, a control unit 7 comprising a CPU for controlling a state of electricity generation in the generator 4, a state of charge and discharge in each of the first and second electricity storage units 3, 6, and others, and various memories, is installed on a floor panel at a position just below a driver seat or a front passenger seat. Further, a second harness 8 is laid out along a wheel arch formed just above the front wheel 2, to connect the first electricity storage unit 3 and the control unit 7, etc.

Figure 3:
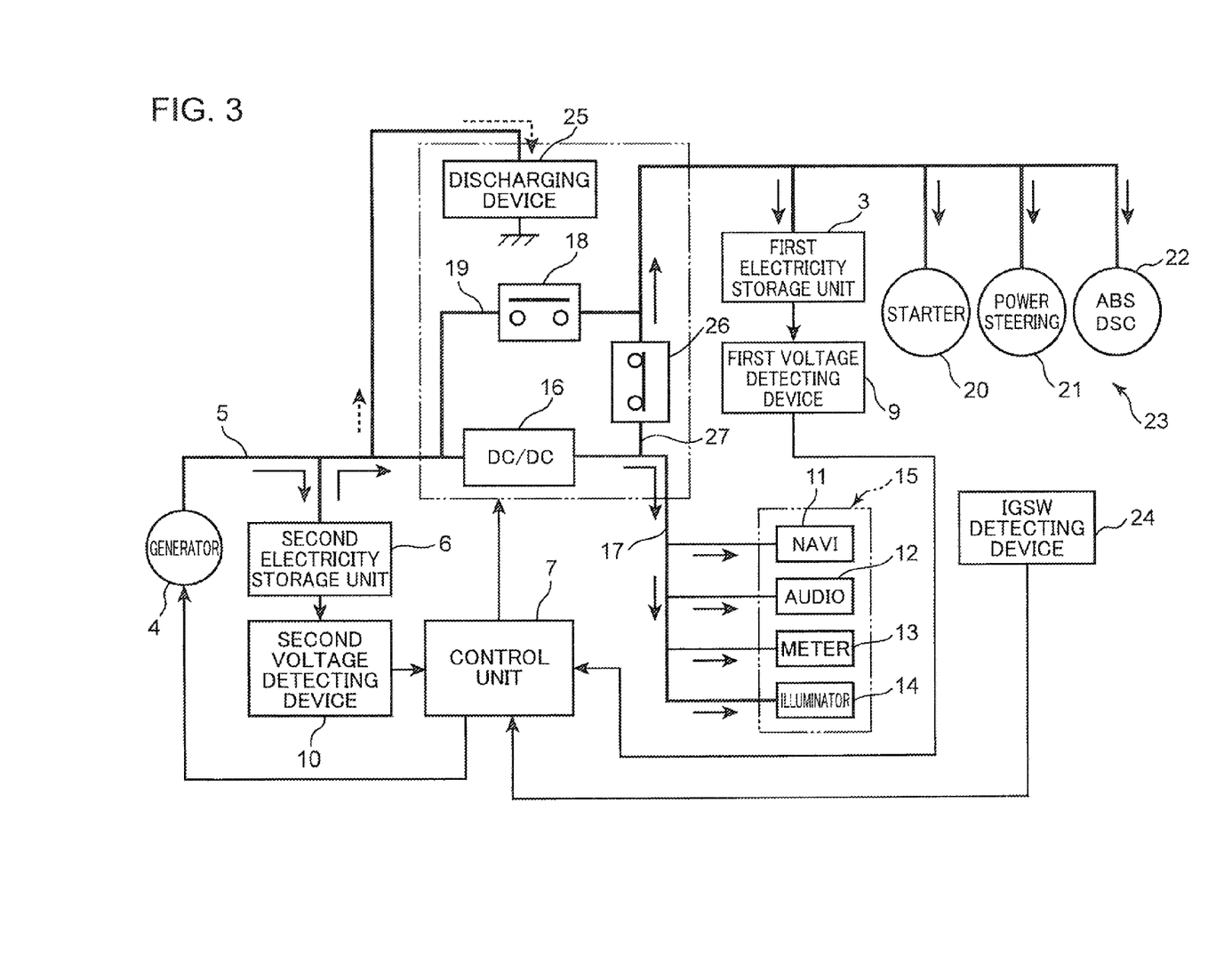
FIG. 3 is a block diagram illustrating the control device according to the present invention.

FIG. 3 is a block diagram illustrating a specific configuration of the vehicle control device according to the present invention. The vehicle control device comprises: a first voltage detecting device 9 for detecting a voltage of the first electricity storage unit 3; a second voltage detecting device 10 for detecting a voltage of the second electricity storage unit 6; and a first electricity supply line 17 connecting a group of first electrical load components 15 each having a relatively small electrical load capacity, such as a navigation unit 11, an audio unit 12, a meter unit 13 and a vehicle interior illumination unit 14 and the like, and the second electricity storage unit 6, via a DC-DC converter 16. The DC-DC converter 16 has a function of lowering a supply voltage from the second electricity storage unit 6 to a value corresponding to an operating voltage of each of the first electrical load components 15, for example, about 14 V.

The first electricity storage unit 3 and the second electricity storage unit 6 are connected to each other via a second electricity supply line 19 having a bypass relay 18 inserted in parallel with the DC-DC converter 16. Further, a group of second electrical load components each having a relatively large electrical load capacity, such as an engine starting starter 20, a power steering unit 21, and an ABS/DSC unit 22, are connected to the second electricity storage unit 6 via the second electricity supply line 19.

The vehicle control device further comprises: an ignition switch detecting device 24 for detecting an operational state of an ignition switch of the vehicle; and a discharging device 25 having a resistance circuit for discharging electricity stored in the second electricity storage unit 6. The discharging device 25 is configured to, according to a control signal output from the control unit 7 when the ignition switch detecting device 24 detects that a turn-off operation of the ignition switch is performed, and the second voltage detecting device 10 detects that the voltage of the second electricity storage unit 6 is equal to or greater than a preset reference value (e.g., about 16V), connect the second electricity storage unit 6 to the ground via a vehicle body of the vehicle to thereby discharge electricity stored in the second electricity storage unit 6.

The first electricity supply line 17 and the second electricity supply line 19 are connected to each other by a connection line 27 having a connection relay 26, at a position downstream of the DC-DC converter 16 and the bypass relay 18. Thus, as illustrated in FIG. 3, in a normal state in which the bypass relay 18 of the second electricity supply line 19 is set to an OFF state, and the connection relay 26 is set to an ON state, a current supplied from the second electricity storage unit 6 is lowered in voltage to about 14 V through the DC-DC converter 16, and, in this state, supplied to the first electrical load components 15 including the navigation unit 11 via the first electricity supply line 17 and to the first electricity storage unit 3 and the second electrical load components 23 via the connection line 27.

Figure 4:
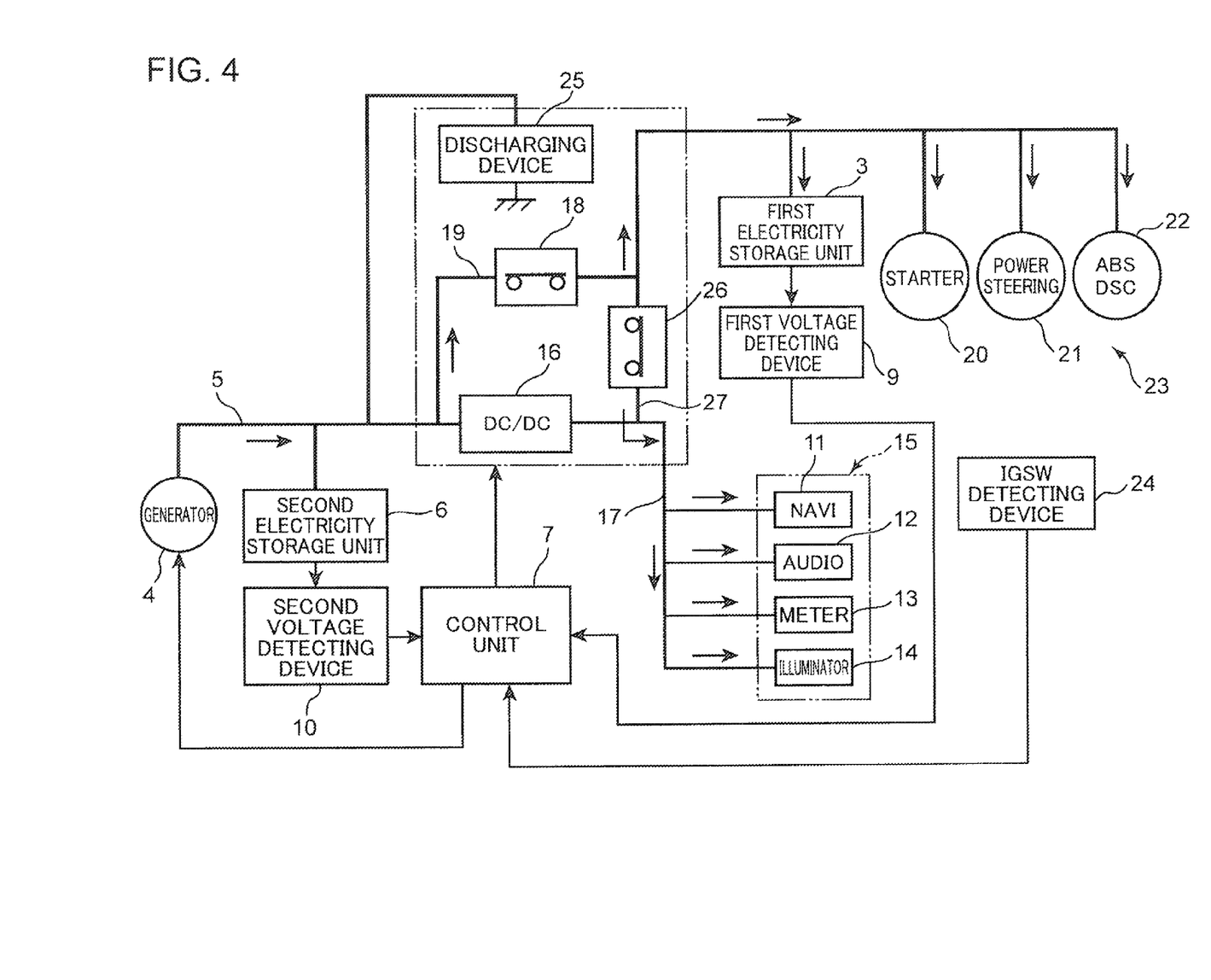
FIG. 4 is a block diagram of a state when each of a connection relay and a bypass relay is set to an ON state.

On the other hand as illustrated in FIG. 4, in a state in which the connection relay 26 is kept in the ON state, and the bypass relay 18 of the second electricity supply line 19 is set to an ON state, an output current from the generator 4 or a current from the second electricity storage unit 6 is supplied to the first electricity storage unit 3 and the second electrical load components 23 including the power steering unit 21 via the second electricity supply line 19, and further supplied to the first electrical load components 15 including the navigation unit 11 via the connection line 27.

In the above configuration, in the normal travel state of the vehicle, as illustrated in FIG. 3, the control unit 7 performs a control operation of setting the bypass relay 18 of the second electricity supply line 19 to the OFF state, and setting the connection relay 26 of the connection line 27 to the ON state. In this state, during a vehicle deceleration or downhill travel, the generator 4 generates electricity at a voltage of about 25 V, and the resulting generator output current is supplied to the second electricity storage unit 6 to charge it. Then, electricity stored in the second electricity storage unit 6 is effectively utilized in such a manner as to be supplied to the first electrical load components 15 including the navigation unit 11 via the first electricity supply line 17, while being lowered in voltage to about 14 V through the DC-DC converter 16, and further supplied to the first electricity storage unit 3 and the second electrical load components 23 via the connection line 27.

That is, electricity of the second electricity storage unit 6 is supplied to the first electrical load components 15 including the navigation unit 11 via the first electricity supply line 17 having the DC-DC converter 16, and, according to need, supplied to the first electricity storage unit 3 and the second electrical load components 23 via the connection line 27. Further, when the voltage of the first electricity storage unit 3 is lower than a standard voltage preliminarily set, for example, to about 12 V, charge for the first electricity storage unit 3 is performed by a supply current from the second electricity storage unit 6.

When the engine is in an operating state, and the second electricity storage unit 6 is lowered in voltage to less than 14 V, for example, due to consumption of electricity thereof, a control operation of setting each of the bypass relay 18 of the second electricity supply line 19 and the connection relay 26 of the connection line 27 to an ON state as illustrated in FIG. 4 is performed according to a control signal output from the control unit 7. In this state, the generator 4 is driven by the engine of the vehicle, to generate electricity at a voltage of about 12 to 14 V, so that the resulting generator output current is supplied to the first electricity storage unit 3 and the second electrical load components 23 including the power steering unit 21 via the second electricity supply line 19, and further supplied to the first electrical load components 15 including the navigation unit 11 via the connection line 27, and, according to need, charge the first electricity storage unit 3.

Figure 5:
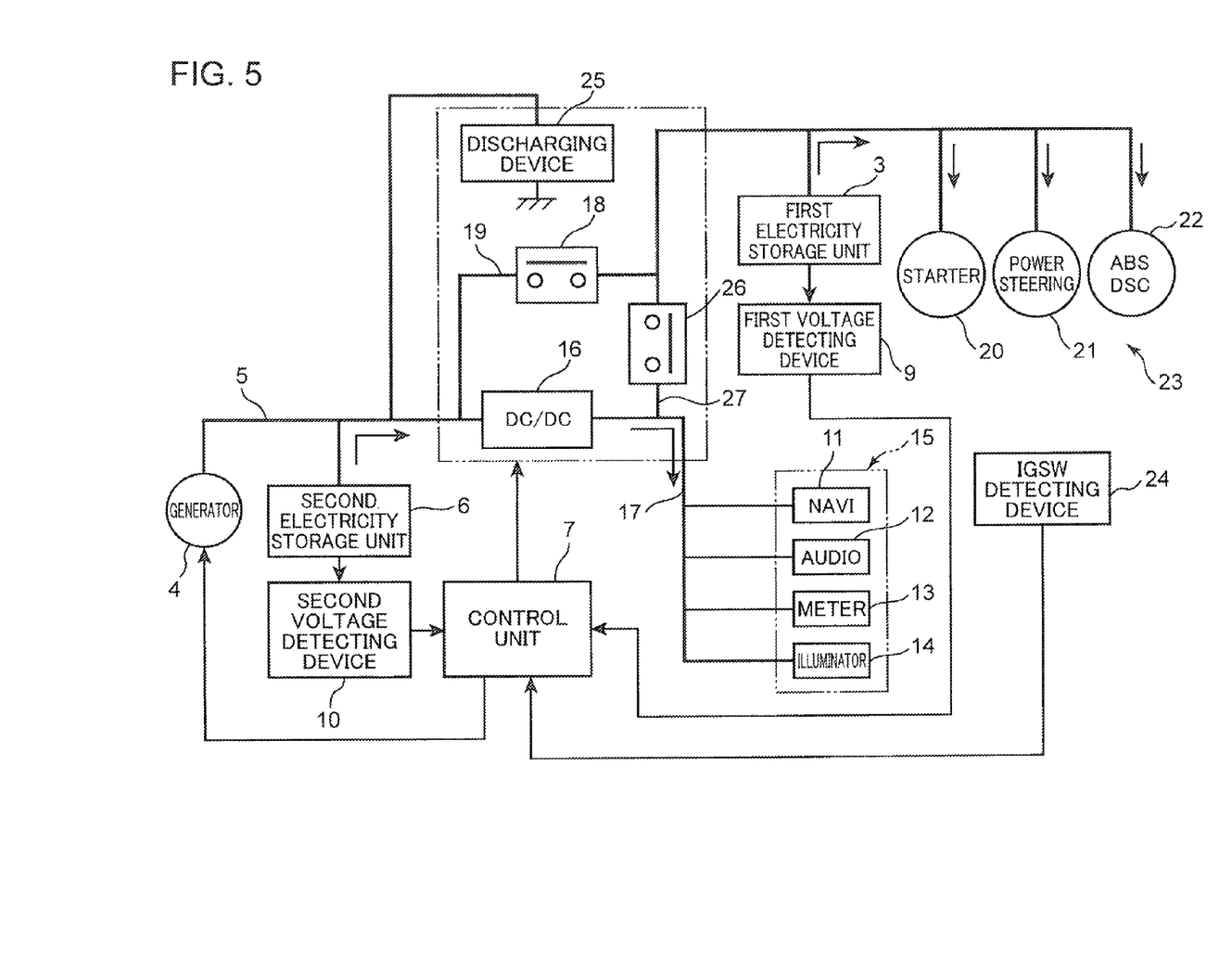
FIG. 5 is a block diagram of a state when each of the connection relay and the bypass relay is set to an OFF state.

In the case where the control unit 7 of the vehicle comprises an automatic stop control section (not illustrated) for performing an engine automatic control operation of automatically stopping the engine when an engine automatic stop condition is satisfied, and, then when a condition for restarting the engine being automatically stopped is satisfied, activating the starter 20 to automatically restart the engine, when it is determined that the voltage of the second electricity storage unit 6 detected by the second voltage detecting device 10 has an adequate value falling within a preset range of 14 V to 25 V, the control unit 7 performs a control operation of setting each of the bypass relay 18 of the second electricity supply line 19 and the connection relay 26 of the connection line 27 to an OFF state, as illustrated in FIG. 5.

When the engine is in the automatically stopped state, electricity stored in the second electricity storage unit 6 is supplied to the first electrical load components 15 including the navigation unit 11 via the first electricity supply line 17 having the DC-DC converter 16. Further, with respect to the second electrical load components 23, such as the engine starting starter 20 and the power steering unit 21 and the like, having a relatively large electrical load capacity as compared to the first electrical load components 15 including the audio unit 12, electricity from the first electricity storage unit 3 is supplied.

As above, when the engine is in the automatically stopped state, each of the bypass relay 18 and the connection relay 26 is set to the OFF state, thereby preventing a situation where electricity from the second electricity storage unit 6 is supplied to the second electrical load components 23 each having a relatively large electrical load capacity. In this case, it becomes possible to prevent the occurrence of a situation where electricity of the second electricity storage unit 6 is lowered to a rated voltage or less, for example, about 14 V or less, and thereby effectively prevent the occurrence of a situation where, before the engine is restarted, the first electrical load components 15 including the audio unit 12 becomes unusable.

Figure 6:
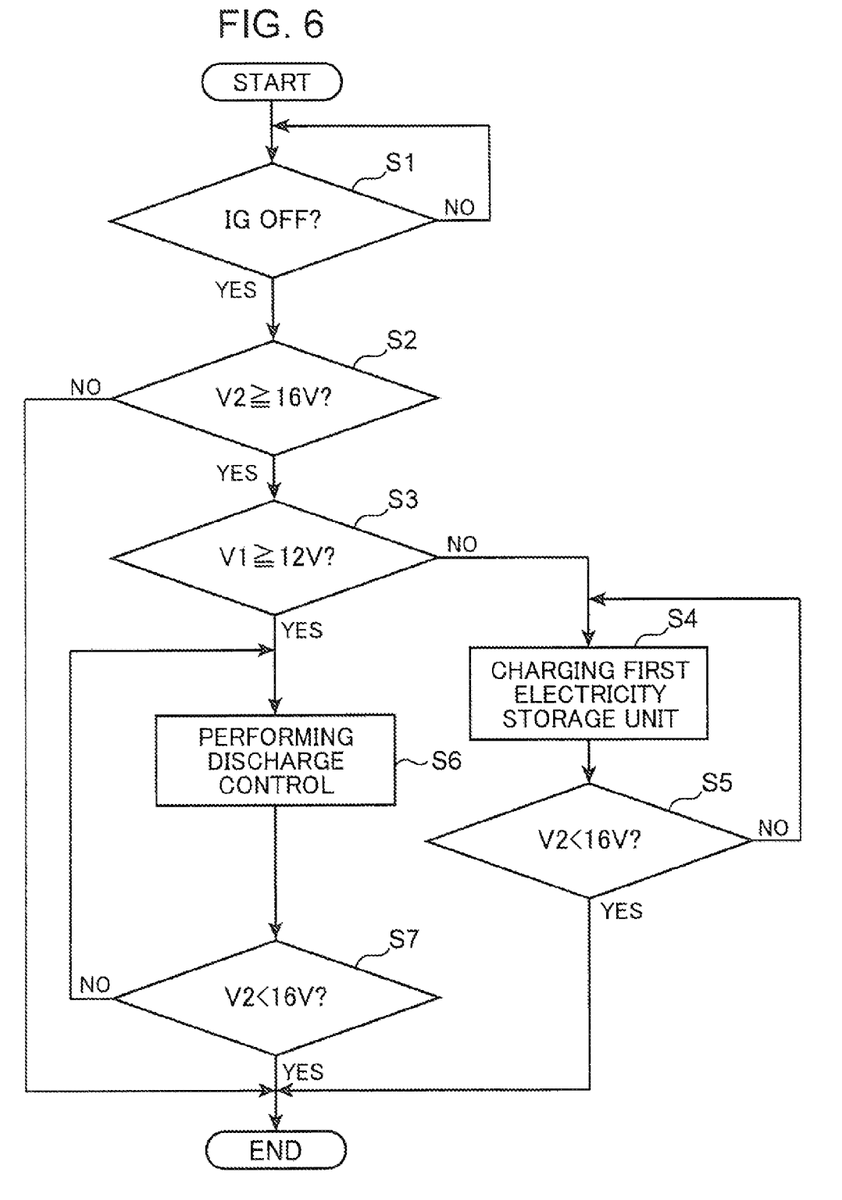
FIG. 6 is a flowchart illustrating a control operation in a control device according to one embodiment of the present invention.

Based on the flowchart illustrated in FIG. 6, a control operation will be described which is configured to discharge electricity stored in the second electricity storage unit 6 by using the discharging device 25, when the ignition switch detecting device 24 detects that a turn-off operation of the ignition switch is performed, and the second voltage detecting device 10 detects that the voltage of the second electricity storage unit 6 is equal to or greater than a preset reference value.

Upon start of the control operation, first of all, according to an output signal from the ignition switch detecting device 24, it is determined whether or not the turn-off operation of the ignition switch is performed (Step S1). At a point of time at which the determination is made as YES, it is determined whether an voltage V2 of the second electricity storage unit 6 detected by the second voltage detecting device 10 is equal to or greater than a preset reference value (16 V) (Step S2). When the determination in the Step S2 is NO, i.e., the voltage V2 of the second electricity storage unit 6 is determined to be less than the reference value (16 V), the routine returns to terminate the control operation, without performing the discharge control operation using the discharging device 25 and others.

When the determination in the Step S2 is made as YES, i.e., the voltage V2 of the second electricity storage unit 6 is determined to be equal to or greater than the reference value (16 V), it is determined whether or not an voltage V1 of the first electricity storage unit 3 detected by the first voltage detecting device 9 is less than a preset standard value preliminarily set to about 12 V (Step S3). When the determination in the Step S3 is made as NO, a control operation is performed which is configured to supply electricity of the second electricity storage unit 6 to the first electricity storage unit 3 to charge it (Step S4).

Specifically, as illustrated in FIG. 3, the bypass relay 18 of the second electricity supply line 19 is set to the OFF state, and the connection relay 26 of the connection line 27 is set to the ON state, to supply electricity stored in the second electricity storage unit 6 to the first electricity storage unit 3 via the DC-DC converter 16 and the connection line 27, thereby charging the first electricity storage unit 3. Then, it is determined whether or not the voltage V2 of the second electricity storage unit 6 is lowered to less than the preset reference value (16 V) (Step S5). When the determination is made as NO, the routine returns to the Step S4 and the above control operation will be repeated. On the other hand, when the determination in the Step S5 is made as YES, the control operation is terminated.

In the Step S3, when the determination is made as YES, i.e., the voltage V1 of the first electricity storage unit 3 is determined to be equal to or greater than the standard voltage (about 12 V), a control operation is performed which is configured to activate the discharging device 25 to allow electricity of the second electricity storage unit 6 to be discharged to the ground (vehicle body) through the discharging device 25 as shown by a broken line in FIG. 3. (Step S6).

Then, it is determined whether the voltage V2 of the second electricity storage unit 6 detected by the second voltage detecting device 10 is lowered to less than the preset reference value (about 16 V) (Step S7). When the determination is made as NO, the routine returns to the Step S6 to continue the above discharge control operation. Then, when the determination in the Step S7 is made as YES, i.e., it is determined that the voltage V2 of the second electricity storage unit 6 is lowered to less than the preset reference value (about 16 V), the discharge control operation using the discharging device 25 is terminated.

As above, the vehicle control device for supplying electricity to the electrical load components 15, 23 of the vehicle comprises: the first electricity storage unit 3 including a lead battery and capable of holding electricity over a long period of time; the second electricity storage unit 6 including a capacitor and capable of more rapid charge and discharge than the first electricity storage unit 3; the ignition switch detecting device 24 for detecting an operational state of the ignition switch of the vehicle; the second voltage detecting device 10 for detecting the voltage of the second electricity storage unit 6; and the discharging device 25 for, when the ignition switch detecting device 24 detects that a turn-off operation of the ignition switch is performed, and the second voltage detecting device 10 detects that the voltage of the second electricity storage unit 6 is equal to or greater than a preset reference value, discharging electricity stored in the second electricity storage unit 6. This provides an advantage of being able to effectively utilize electrical energy of the vehicle, and effectively prevent early deterioration of the second electricity storage unit 6.

Specifically, the second electricity storage unit 6 including a capacitor and capable of rapid charge and discharge is provided, in addition to the first electricity storage unit as a normal type including a lead battery, so that, during vehicle deceleration or downhill travel, the generator 4 generates electricity at a voltage of about 25 V, and the resulting generator output current is supplied to the second electricity storage unit 6 to charge it. Then, electricity stored in the second electricity storage unit 6 is lowered in voltage to about 14 V through the DC-DC converter 16, and, in this state, supplied to the first electrical load components 15 including the navigation unit 11 and to the first electricity storage unit 3 and the second electrical load components 23, so that it becomes possible to effectively enhance fuel economy of the vehicle by effectively utilizing regenerative energy during vehicle deceleration, etc.

Further, when it is confirmed that the voltage of the second electricity storage unit 6 detected by the second voltage detecting device 10 is equal to or greater than the preset reference value (16 V), at a point of time at which the turn-off operation of the ignition switch is confirmed according to an output signal from the ignition switch detecting device 24, the discharge control operation using the discharging device 25 is performed. This provides an advantage of being able to set an upper limit value of a charge voltage to a fairly high value as compared to a lead battery or the like, and effectively prevent early deterioration of the second electricity storage unit 6 including a capacitor, which would otherwise be apt to undergo early deterioration due to a situation where it is left under a condition that a stored voltage is maintained at a high value.

As mentioned in the above embodiment, when the voltage of the second electricity storage unit 6 detected by the second voltage detecting device 10 becomes less than the preset reference value (16 V) after start of the discharge control operation using the discharging device 25, discharge of electricity stored in the second electricity storage unit 6 is stopped. In this case, it becomes possible to effectively prevent the occurrence of early deterioration due to a situation where the stored voltage of the second electricity storage unit 6 is excessively lowered. Further, for example, in a situation where the engine is restarted after a fairly long time has elapsed from stop of the engine, if the voltage of the second electricity storage unit 6 is lowered to less than a rated value of about 9 V, a negative effect, such as a problem of causing the generator 4 to fail to generate electricity, occurs. However, the technique of stopping discharge of the electricity just before the voltage of the second electricity storage unit 6 becomes less than the preset reference value (16 V) has an advantage of being able to effectively prevent the negative effect.

In the above embodiment, the first voltage detecting device 9 for detecting the voltage of the second electricity storage unit 6 is provided, and, when it is detected that a detection value of the first voltage detecting device 9 is less than a standard value preliminarily set to about 12 V, at a point of time at which the ignition switch is switched from an ON state to an OFF state, electricity of the second electricity storage unit 6 is supplied to and stored in the first electricity storage unit 3, so that it becomes possible to prevent electricity of the second electricity storage unit 6 from being wastefully discarded, thereby facilitating effective utilization thereof, and effectively prevent the first electricity storage unit 3 including a lead battery from undergoing early deterioration due to a situation where the voltage of the first electricity storage unit 3 is excessively lowered after the stop of the engine.

The above embodiment has been described based on an example where, when the switching of the ignition switch from the ON state to the OFF state is confirmed according to the detection signal from the ignition switch detecting device 24, and it is detected that the detection value of the first voltage detecting device 9 is less than a standard value preliminarily set to about 12 V, the control operation of supplying electricity of the second electricity storage unit 6 thereto to charge it is performed, and, then when it is confirmed that the voltage of the second electricity storage unit 3 becomes less than the reference value, the charge control operation for the first electricity storage unit 3 is stopped. Instead of this configuration, the system may be configured as illustrated in FIG. 7.

Figure 7:
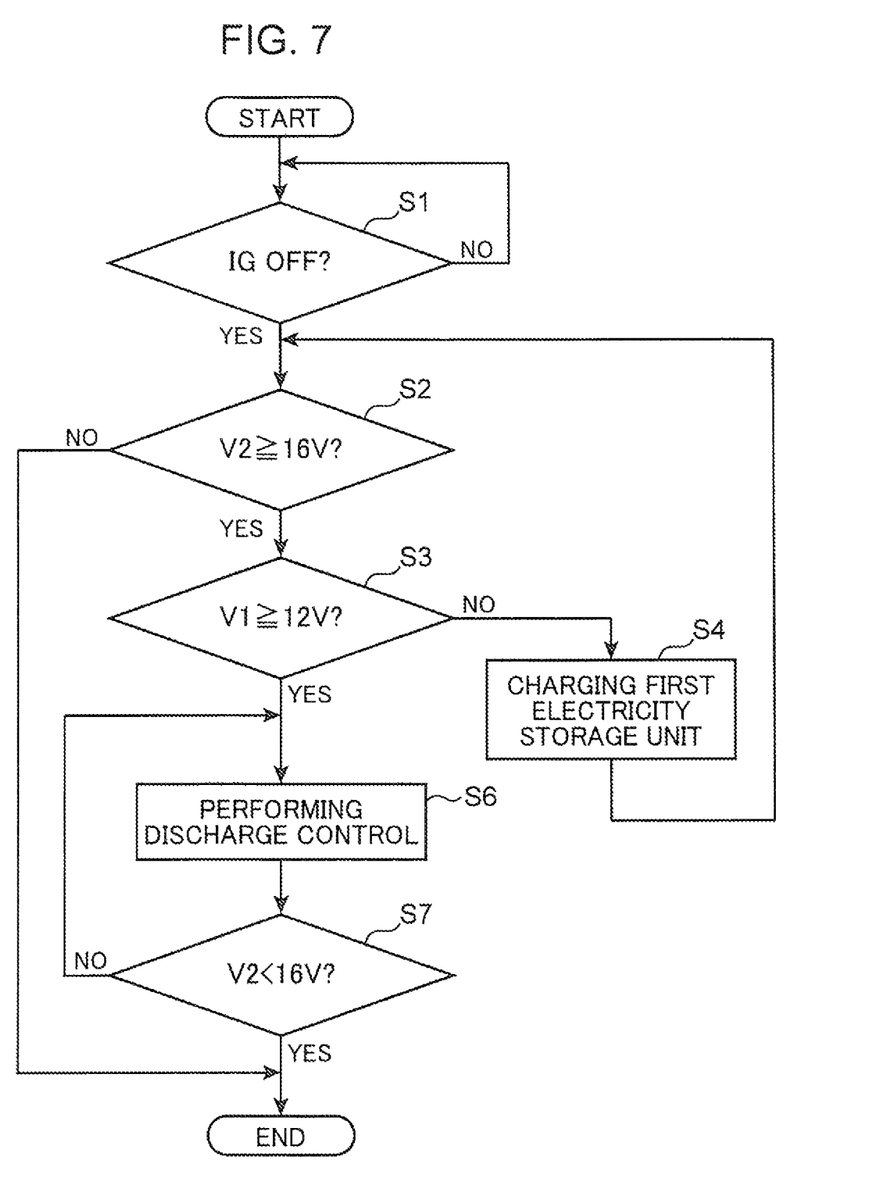
FIG. 7 is a flowchart illustrating a control operation in a control device according to another embodiment of the present invention.

Specifically, in the flowchart illustrated in FIG. 7, when it is determined in Step S1 that the turn-off operation of the ignition switch is performed and then it is determined in Step S2 that the voltage V2 of the second electricity storage unit 6 is equal to or greater than the preset reference value (16 V), whereafter it is determined in Step S3 that the voltage V1 of the first electricity storage unit 3 is not equal to or greater than a standard voltage preliminarily set to about 12V, the charge control operation for the first electricity storage unit 3 is started (Step S4). Then, the routine returns to the Step S2 in which it is determined whether or not the voltage V2 of the second electricity storage unit 6 is equal to or greater than the reference value of about 16 V, and, in the Step S3, it is determined whether or not the voltage of the first electricity storage unit 3 becomes equal to or greater than the standard voltage of about 12V.

When the determination in the Step S3 is made as YES, i.e., it is confirmed that the voltage of the second electricity storage unit 6 becomes equal to or greater than the reference value of about 16 V, and the voltage of the first electricity storage unit 3 becomes equal to or greater than the standard voltage, the charge control operation for the first electricity storage unit 3 is stopped, and the routine shifts to Step S6 in which a control operation of activating the discharging device 25 to discharge electricity of the second electricity storage unit 6 is performed. This configuration has an advantage of being able to effectively utilize electricity of the second electricity storage unit 6, and prevent early deterioration due to a situation where the voltage of the first electricity storage unit 3 including a lead battery is excessively lowered, and early deterioration of the second electricity storage unit 6 including a capacitor.

Instead of the above embodiment where the second electricity storage unit 6 including a plurality of electrical double layer capacitor cells is employed, a hybrid capacitor such as a lithium-ion battery, or a high-output lithium-ion battery.

OUTLINE OF EMBODIMENTS OF THE PRESENT INVENTION

The above embodiments include an invention concerning a vehicle control device for supplying electricity to an electrical load component of a vehicle. The vehicle control device comprises: a first electricity storage unit capable of holding electricity over a long period of time; a second electricity storage unit capable of more rapid charge and discharge than the first electricity storage unit; an ignition switch detecting device for detecting an operational state of an ignition switch of the vehicle; a voltage detecting device for detecting a voltage of the second electricity storage unit; and a discharging device for, when the ignition switch detecting device detects that a turn-off operation of the ignition switch is performed, and the voltage detecting device detects that the voltage of the second electricity storage unit is equal to or greater than a preset reference value, discharging electricity stored in the second electricity storage unit.

In the present invention having the above feature, the second electricity storage unit including a capacitor and capable of rapid charge and discharge is provided, in addition to the first electricity storage unit as a normal type including a lead battery, so that, during vehicle deceleration or downhill travel, an output current from a generator can be supplied to the second electricity storage unit to charge it, thereby effectively enhancing fuel economy of the vehicle by effectively utilizing regenerative energy during vehicle deceleration, etc. Further, when it is confirmed that the voltage of the second electricity storage unit detected by the voltage detecting device is equal to or greater than the preset reference value, at a point of time at which the turn-off operation of the ignition switch is confirmed according to an output signal from the ignition switch detecting device, the discharge control operation using the discharging device is performed, thereby providing an advantage of being able to effectively prevent early deterioration of the second electricity storage unit.

In the above control device, the discharging device may be configured to, when it is detected that the voltage of the second electricity storage unit detected by the voltage detecting device becomes less than a preset reference value, stop the discharge of electricity stored in the second electricity storage unit.

According to this feature, when the voltage of the second electricity storage unit detected by the voltage detecting device becomes less than the preset reference value after start of the discharge control operation using the discharging device, discharge of electricity stored in the second electricity storage unit is stopped. This provides an advantage of being able to effectively prevent the occurrence of early deterioration due to a situation where the stored voltage of the second electricity storage unit is excessively lowered.

The above control device may further comprise a first voltage detecting device for detecting a voltage of the first electricity storage unit, wherein the discharging device may be configured to, when it is detected that a detection value of the first voltage detecting device is less than a preset standard value, at a point of time at which the ignition switch is switched from an ON state to an OFF state, allow electricity of the second electricity storage unit to be supplied to and stored in the first electricity storage unit.

According to this feature, when it is detected that the voltage of the first electricity storage unit detected by the first voltage detecting device is less than the preset standard value, at the point of time at which the ignition switch is switched from the ON state to the OFF state, electricity of the second electricity storage unit is supplied to and stored in the first electricity storage unit. This provides an advantage of being able to prevent electricity of the second electricity storage unit from being wastefully discarded, thereby facilitating effective utilization thereof, and effectively prevent the first electricity storage unit including a lead battery from undergoing early deterioration due to a situation where the voltage of the first electricity storage unit is excessively lowered.

In the above control device, the discharging device may be configured to, when it is directed that a detection value of the first voltage detecting device becomes equal to or greater than a preset upper limit reference value, stop the charge of the first electricity storage unit, and start the discharge of electricity stored in the second electricity storage unit.

According to this feature, when it is directed that the detection value of the first voltage detecting device becomes equal to or greater than the preset upper limit reference value, the charge of the first electricity storage unit is stopped, and the discharging device starts the discharge of electricity stored in the second electricity storage unit. This provides an advantage of being able to effectively utilize electricity of the second electricity storage unit, and prevent early deterioration due to a situation where the voltage of the first electricity storage unit including a lead battery is excessively lowered, and early deterioration of the second electricity storage unit including a capacitor.

When the electrical load component comprises a first electrical load component having a relatively small electrical load capacity, and a second electrical load component having a relatively large electrical load capacity, the first electrical load component may be at least one selected from the group consisting of a navigation unit, an audio unit, a meter unit, and a vehicle interior illumination unit, and the second electrical load component may be at least one selected from the group consisting of an engine starting starter, a power steering unit, and an ABS/DSC unit.

The above control device may further comprise an automatic stop control device for automatically stopping an engine when a given engine automatic stop condition is satisfied, wherein the control device is configured to, when the engine is in an automatically stopped state, supply electricity stored in the first electricity storage unit to the second electrical load component, and supply electricity stored in the second electricity storage unit to the first electrical load component.

As above, the system is configured to, when the engine is in the automatically stopped state, prevent a situation where electricity from the second electricity storage unit is supplied to the second electrical load component having a relatively large electrical load capacity. In this case, it becomes possible to prevent the occurrence of a situation where electricity of the second electricity storage unit is lowered to a rated voltage or less, for example, about 14 V or less, and thereby effectively prevent the occurrence of a situation where, before the engine is restarted, the first electrical load component including the audio unit becomes unusable.

The above control device may be configured to, in a normal travel state of the vehicle, and when the voltage of the second electricity storage unit detected by the voltage detecting device is equal to or greater than the preset reference value, supply electricity stored in the second electricity storage unit to the first electricity storage unit, the first electrical load component, and the second electrical load component.

That is, electricity of the second electricity storage unit is supplied to the first electrical load component including the navigation unit, and, according to need, supplied to the first electricity storage unit and the second electrical load component. Then, when the voltage of the first electricity storage unit is lower than the standard voltage set, for example, to about 12 V, charge for the first electricity storage unit is performed by a supply current from the second electricity storage unit. Thus, electricity stored in the second electricity storage unit can be effectively utilized.

This application is based on Japanese Patent Application Serial No. 2011-110435 filed in Japan Patent Office on May 17, 2011, the contents of which are hereby incorporated by reference.

While the present invention has been described appropriately and fully by way of embodiments as above with reference to the drawings in order to express the invention, it should be appreciated that those skilled in the art can readily change and/or modify the above embodiments. Therefore, unless otherwise a changed or modified embodiment is of a level departing from the scope of the present invention defined in the appended claims, it should be construed as being included therein.

What is claimed is:

1. A vehicle control device for supplying electricity to an electrical load component of a vehicle, comprising:
   a first electricity storage unit including a lead battery and capable of holding electricity over a long period of time;
   a second electricity storage unit serving as an electricity storage unit for storing electricity generated by an alternator at least during deceleration of the vehicle, the second electricity storage unit comprising a capacitor constructed by series-connecting a plurality of electrical double layer capacitor cells, and capable of being charged and discharged more rapidly than the first electricity storage unit;
   an ignition switch detecting device for detecting an operational state of an ignition switch of the vehicle;
   a first voltage detecting device for detecting a voltage of the first electricity storage unit;
   a second voltage detecting device for detecting a voltage of the second electricity storage unit;
   a discharging device for discharging electricity stored in the second electricity storage unit, to a vehicle body of the vehicle;
   a connection line connecting the first electricity storage unit and the second electricity storage unit together and having a relay; and
   a control unit for controlling the discharging device and the relay,
   wherein the control unit is configured to control the discharging device and the relay, in such a manner that, when it is detected that a detection value of the first voltage detecting device is less than a preset standard value and the voltage of the second electricity storage unit detected by the second voltage detecting device is equal to or greater than a preset reference value, at a point of time at which the ignition switch is switched from an ON state to an OFF state, electricity stored in the second electricity storage unit is supplied to and stored in the first electricity storage unit, and, when it is detected that the detection value of the first voltage detecting device is equal to or greater than the preset standard value, and the voltage of the second electricity storage unit detected by the second voltage detecting device is equal to or greater than the preset reference value, at the point of time, electricity stored in the second electricity storage unit is discharged to the vehicle body.

2. The vehicle control system as defined in claim 1, wherein the control unit is configured to, when it is detected that the voltage of the second electricity storage unit detected by the second voltage detecting device becomes less than the preset reference value, stop the discharge of electricity stored in the second electricity storage unit, and the supply of the electricity to the first electricity storage unit.

3. The vehicle control system as defined in claim 1, wherein the control unit is configured to, when it is detected that a detection value of the first voltage detecting device becomes equal to or greater than a preset upper limit reference value, in the course of allowing electricity stored in the second electricity storage unit to be supplied to and stored in the first electricity storage unit, stop the charge of the first electricity storage unit, and start the discharge of electricity stored in the second electricity storage unit.

4. The vehicle control system as defined in claim 1, wherein the electrical load component comprises a first electrical load component having a relatively small electrical load capacity, and a second electrical load component having a relatively large electrical load capacity.

5. The vehicle control system as defined in claim 4, wherein
   the first electrical load component is at least one selected from the group consisting of a navigation unit, an audio unit, a meter unit, and a vehicle interior illumination unit; and
   the second electrical load component is at least one selected from the group consisting of an engine starting starter, a power steering unit, and an ABS/DSC unit.

6. The vehicle control system as defined in claim 5, which further comprises an automatic stop control device for automatically stopping an engine when a given engine automatic stop condition is satisfied, wherein the vehicle control system is configured to, when the engine is in an automatically stopped state, supply electricity stored in the first electricity storage unit to the second electrical load component, and supply electricity stored in the second electricity storage unit to the first electrical load component.

7. The vehicle control system as defined in claim 5, which is configured to, in a normal travel state of the vehicle, and when the voltage of the second electricity storage unit detected by the voltage detecting device is equal to or greater than the preset reference value, supply electricity stored in the second electricity storage unit to the first electricity storage unit, the first electrical load component, and the second electrical load component.

* * * * *